(12) United States Patent
Yu et al.

(10) Patent No.: US 7,724,302 B2
(45) Date of Patent: May 25, 2010

(54) OPENING STRUCTURE FOR AN IMAGING DEVICE

(76) Inventors: Anchi Yu, 5F.-1, No.65, Lane 525, Sec. 1, Guangfu Rd., Hsinchu City 300 (TW); Po-Ching Lu, No.2, Fongnian Rd., Yanbei Village, Yanpu Township, Pingtung County 907 (TW); Chiung-Ying Chang, 6F.-1, No.3, Lane 200, Baoshan Rd., Hsinchu City 300 (TW)

( * ) Notice: Subject to any disclaimer, the term of this patent is extended or adjusted under 35 U.S.C. 154(b) by 1006 days.

(21) Appl. No.: 10/838,360

(22) Filed: May 5, 2004

(65) Prior Publication Data

US 2005/0195321 A1 Sep. 8, 2005

(30) Foreign Application Priority Data

Mar. 3, 2004 (TW) .............................. 93105629 A

(51) Int. Cl.
*H04N 5/225* (2006.01)
(52) U.S. Cl. ...................................... 348/373; 348/376
(58) Field of Classification Search ......... 348/373–376; 396/448, 439, 348; 350/429
See application file for complete search history.

(56) References Cited

U.S. PATENT DOCUMENTS

| | | | | |
|---|---|---|---|---|
| 3,680,455 A * | 8/1972 | Meinunger | .................. | 396/348 |
| 3,750,549 A * | 8/1973 | Waaske | ....................... | 396/349 |
| 3,942,864 A * | 3/1976 | Numbers | ...................... | 359/511 |
| 3,988,752 A * | 10/1976 | Winkler et al. | .............. | 396/155 |
| 4,189,222 A * | 2/1980 | Maitani | ....................... | 396/205 |
| 4,793,818 A * | 12/1988 | Poirier | ....................... | 439/140 |
| 4,810,833 A * | 3/1989 | Meyers | ......................... | 174/67 |
| 5,107,075 A * | 4/1992 | Currier, Jr. | .................... | 174/67 |
| 5,784,657 A * | 7/1998 | Manabe | ....................... | 396/299 |
| 5,943,521 A * | 8/1999 | Lamphron et al. | .......... | 396/448 |
| 6,036,376 A * | 3/2000 | Owashi et al. | .............. | 396/349 |
| 6,257,776 B1 * | 7/2001 | Sakimoto | ..................... | 396/448 |
| 6,322,259 B1 * | 11/2001 | Miyamoto et al. | .......... | 396/448 |
| 6,435,739 B1 | 8/2002 | Tanaka | | |
| 6,735,381 B2 * | 5/2004 | Litzenberger | .................. | 396/6 |
| 2001/0020980 A1 * | 9/2001 | Misawa | ....................... | 348/375 |

* cited by examiner

*Primary Examiner*—Tuan Ho
*Assistant Examiner*—Kent Wang
(74) *Attorney, Agent, or Firm*—Perkins Coie LLP

(57) ABSTRACT

An opening structure of image device comprises a body, at least a sliding track, at least a sliding sleeve, and a shield, wherein the sliding sleeve slide on the sliding track in order to drive synchronously the shield to achieve opening or closing status. Furthermore, the image device is entirely enclosed into the shield so as to prevent the image device from dust pollution and unexpected damage when the shield is at closing status. Meanwhile, the shield can be designed to be a special look, which will bring to user a fashionable feeling.

21 Claims, 3 Drawing Sheets

OPENING STRUCTURE FOR AN IMAGING DEVICE

BACKGROUND OF THE INVENTION

1. Field of the Invention

The invention relates to an opening structure of an imaging device, more particularly to an opening structure of an imaging device preventing the imaging device from dust pollution and unexpected damage.

2. Description of the Prior Art

Digital devices, such as digital still cameras, digital camcorders and digital players, are very popular nowadays. Such digital devices are also rich in the type and specification, and each consumer can choose his favorite such digital devices easily. However, as a consumer, the fashionable appearances of such digital devices play a very important role.

Therefore, each design of the digital device uses best efforts to create a distinguishable new product in order to attract the consumers. But, we look into the appearance of the digital devices in the market. Most of them may incorporate the body and lens, and such appearance is too common to make any impression on the consumers.

Furthermore, the lens of the general digital device should be free of dust. When such device does not operate, a protection device will be active to protect its lens. The general practice is to incorporate a lens protective cover, or one which can protect the lens automatically while turning off the digital device. This structure can protect the lens from the dust effectively, regardless of the variance in the appearance of the digital device.

SUMMARY OF THE INVENTION

In light of the state of the art described above, it is an object of the present invention to provide an opening structure of imaging device with a shield to prevent the imaging device from dust pollution and unexpected damage after the shield is at closing status in order to entirely enclose the imaging device which is immune to the problems described above.

It is another object of this invention to provide an opening structure of an imaging device with a shield to bring to users a fashionable feeling for its special look.

In view of the above and other objects which will become apparent as the description proceeds, there is provided according to a general aspect of the present invention an opening structure of an imaging device, which comprises a body for putting an imaging device; a sliding track with a first end connected to a lateral side of said body and a second end extended out from said body; and a sliding sleeve with a first end putted on said sliding track and a second end connected to a shield, wherein said shield is at a closing status when said sliding sleeve is located on said first end of said sliding track, and said shield is at an opening status when said sliding sleeve is located on said second end of said sliding track.

Based on the idea described above, wherein said sliding track includes a limit unit and said sliding sleeve includes a fillister, which said limit unit is put into said fillister in order to limit said sliding sleeve to move between said first end and said second end of said sliding track when said sliding sleeve slides on said sliding track.

Based on the aforementioned idea, wherein said limit unit is a bump.

Based on the idea described above, wherein said sliding track further includes a first lock unit located on said first end of said sliding track to fix said sliding sleeve at said first end of said sliding track.

Based on the aforementioned idea, wherein said first lock unit is an elastic piece with bump.

Based on the idea described above, wherein said sliding track further includes a second lock unit located on said second end of said sliding track to fix said sliding sleeve at said second end of said sliding track.

Based on the aforementioned idea, wherein said second lock unit is an elastic piece with bump.

Based on the idea described above, wherein said imaging device is selected from the group consisting of digital still camera, digital camcorder and digital player.

In view of the above and other objects which will become apparent as the description proceeds, there is provided according to a general aspect of the present invention an opening structure of an imaging device, which comprises a body for containing an imaging device; a first sliding track with a first end connected to one lateral side of said body and a second end extended out from said body; a first sliding sleeve with a first end on said first sliding track and a second end connected a first shield; a second sliding track with a first end connected to the other lateral side of said body and a second end extended out from said body; and a second sliding sleeve with a first end on said second sliding track and a second end connected a second shield, wherein it is at a closing status that said first shield and said second shield connect to each other when said first sliding sleeve is located on said first end of said first sliding track and said second sliding sleeve is located on said first end of said second sliding track, and it is at an opening status that said first shield and said second shield disconnect each other when said first sliding sleeve is located on said second end of said first sliding track and said second sliding sleeve is located on said second end of said second sliding track.

Based on the idea described above, wherein said first sliding track includes a limit unit and said first sliding sleeve includes a fillister, which said limit unit is put into said fillister in order to limit said first sliding sleeve to move between said first end and said second end of said first sliding track when said first sliding sleeve slides on said first sliding track.

Based on the aforementioned idea, wherein said limit unit is a bump.

Based on the idea described above, wherein said second sliding track includes a limit unit and said second sliding sleeve includes a fillister, which said limit unit is put into said fillister in order to limit said second sliding sleeve to move between said first end and said second end of said second sliding track when said second sliding sleeve slides on said second sliding track.

Based on the aforementioned idea, wherein said limit unit is a bump.

Based on the idea described above, wherein said first sliding track further includes a first lock unit located on said first end of said first sliding track to fix said first sliding sleeve at said first end of said first sliding track.

Based on the aforementioned idea, wherein said first lock unit is an elastic piece with bump.

Based on the idea described above, wherein said first sliding track further includes a second lock unit located on said second end of said first sliding track to fix said first sliding sleeve at said second end of said first sliding track.

Based on the aforementioned idea, wherein said second lock unit is an elastic piece with bump.

Based on the idea described above, wherein said second sliding track further includes a third lock unit located on said first end of said second sliding track to fix said second sliding sleeve at said first end of said second sliding track.

Based on the aforementioned idea, wherein said third lock unit is an elastic piece with bump.

Based on the idea described above, wherein said second sliding track further includes a fourth lock unit located on said second end of said second sliding track to fix said second sliding sleeve at said second end of said second sliding track.

Based on the aforementioned idea, wherein said fourth lock unit is an elastic piece with bump.

Based on the idea described above, wherein said first shield and said second shield are connected magnetically.

Based on the aforementioned idea, wherein said imaging device is selected from the group consisting of a digital still camera, a digital camcorder and a digital player.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
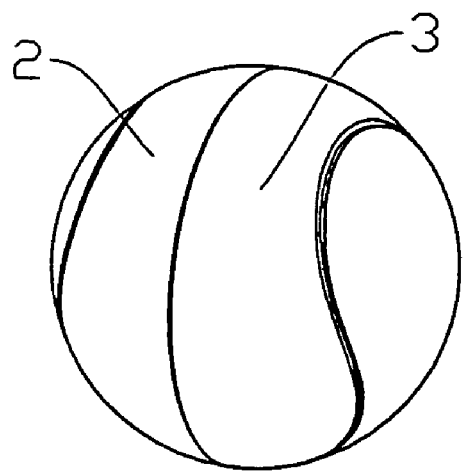
FIG. 1A schematically illustrates the three-dimensional view of the opening structure of an imaging device according to the embodiment of the present invention when the opening structure is at a closing status.
Figure 1B:
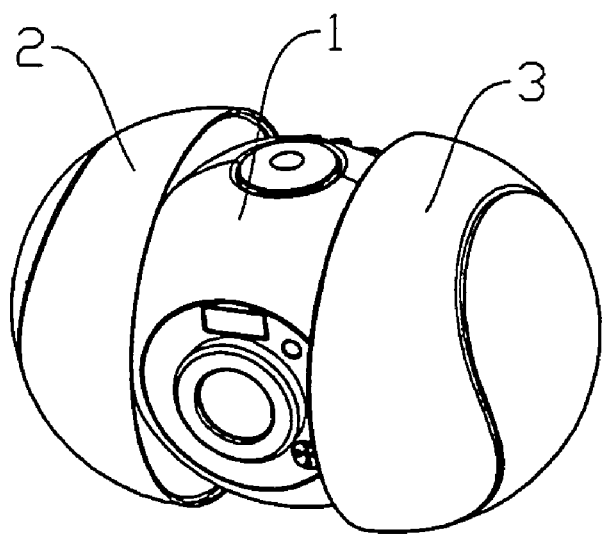
FIG. 1B schematically illustrates the three-dimensional view of the opening structure of an imaging device according to the embodiment of the present invention when the opening structure is at an opening status.

Please refer to FIGS. 1A and 1B, the three-dimensional views of the opening structure of an imaging device at a closing and an opening status respectively according to the embodiment of the present invention are schematically shown. When the imaging device 1 is enclosed within the first shield 2 and the second shield 3, the users see only the outline of two shields as a baseball. But the shape of the shields is not limited as specified in FIG. 1A, the designer can design any shapes for the shields. Only it can be achieve the purpose that the imaging device can be enclosed with the shields and the users see only the outline of the shields after the shields are at closing status. If the user wants to use the imaging device 1, he opens the first shield 2 left and the second shield 3 right, then the imaging device 1 is presented as shown in FIG. 1B. The above shields are not limited as being opened from the middle position of the opening structure, opening the first shield 2 left or opening the second shield 3 right. The designer can design a single shield to enclose the image device and be opened from any position.

Figure 2A:
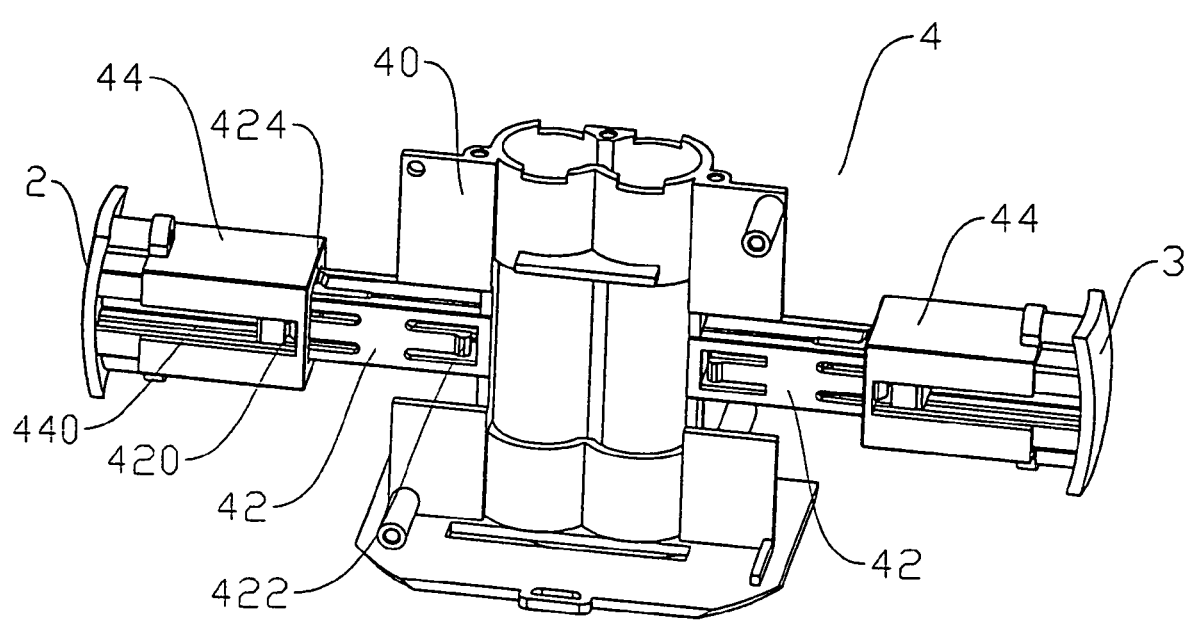
FIG. 2A schematically illustrates the structure view of the opening structure of an imaging device according to the embodiment of the present invention when the opening structure is at an opening status.

Referring to FIG. 2A, which is the structure view of the opening structure of an imaging device according to the embodiment of the present invention when the opening structure is at an opening status. The opening structure 4 includes a body 40, at least a sliding track 42, at least a sliding sleeve 44, and a first shield 2. The body 40 is used to hold the imaging device 1. The first end of the sliding track 42 is connected to a lateral side of the body 40 and the second end of the sliding track 42 is extended out the from body 40. The first end of the sliding sleeve 44 is located on the sliding track 42 and the second end of the sliding sleeve 44 is connected the first shield 2. So the sliding sleeve 44 can slide right or left on the sliding track 42 and drive synchronously the first shield 2. It is the better embodiment of the present invention to offer the combination of two sliding tracks 42 and two sliding sleeves 44. It is better that they are put at the opposite ends of the body 40 to control the moving of the first shield 2 and the second shield 3 separately as shown in FIG. 2A. When two sliding sleeves 44 are located on the first ends of two sliding tracks 42 and the first shield 2 and the second shield 3 are connected each other, the opening structure is at closing status. When two sliding sleeves 44 are located on the second ends of two sliding tracks 42 and the first shield 2 and the second shield 3 are disconnected each other, the opening structure is at opening status.

Further, the sliding track 42 has a limit unit 420 and the sliding sleeve 44 has a fillister 440, wherein the limit unit 420 is put into the fillister 440 when the sliding sleeve 44 slides on the sliding track 42. It can position the sliding sleeve 44 between the first end and the second end of the sliding track 42 for avoiding the sliding sleeve 44 to take off the sliding track 42 to damage the opening structure of imaging device 40. The limit unit 420 is a bump in FIG. 2A, but it can be a protruding spot, hook and other elements with similar function.

The sliding track 42 can further include the first lock unit 422 located at the first end and the second lock unit 424 located at the second end. When the sliding sleeve 44 slides to the first end of the sliding track 42, the first lock unit 422 can fix sliding sleeve 44 at the first end of the sliding track 42. Similarly, when the sliding sleeve 44 slides to the second end of the sliding track 42, the second lock unit 424 can fix sliding sleeve 44 at the second end of the sliding track 42. The first and second lock units 422, 424 can be a bump, but they can be protruding spots, hooks and other elements with similar function.

Figure 2B:
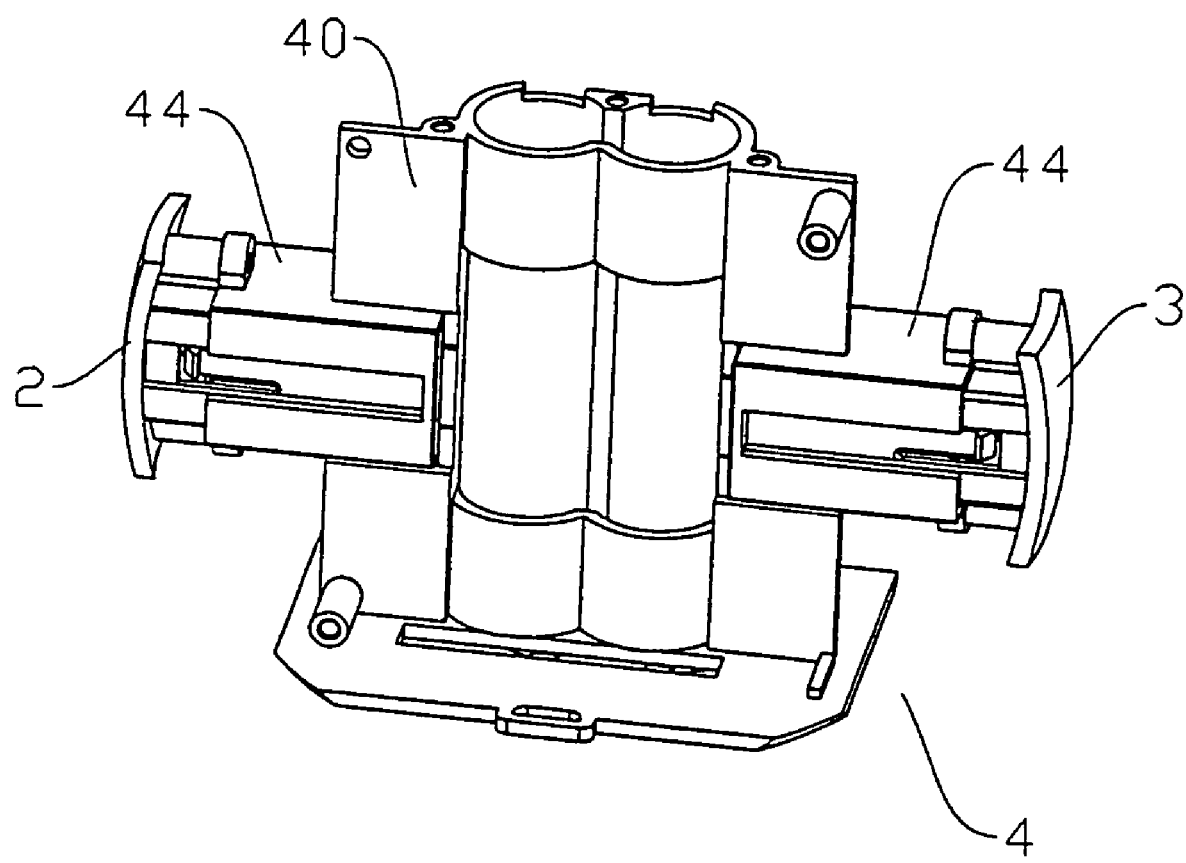
FIG. 2B schematically illustrates the structure view of the opening structure of an imaging device according to the embodiment of the present invention when the opening structure is at a closing status.

Next referring to FIG. 2B, which is the structure view of the opening structure of an imaging device according to the embodiment of the present invention when the opening structure is at closing status. The two sliding sleeves 44 of opening structure 4 are located on the first ends of two sliding tracks 42, so the first shield 2 and the second shield 3 are connected to each other to enclose the image device 1, as shown in FIG. 1A. It is the better embodiment of the present invention that the first shield 2 and the second shield 3 should have respectively a magnetic element to attract each other (not shown in the figures).

Although the specific embodiments have been illustrated and described, it will be obvious to those skilled in the art that various modifications may be made without departing from what is intended to be limited solely by the appended claims.

What is claimed is:

1. An opening structure of an imaging device, the opening structure comprising:

a body configured to hold the imaging device, wherein the body has a first side portion opposite a second side portion;

a first track having a first end portion fixedly attached to the first side portion of the body and a second end portion spaced apart laterally from the body;

a second track having a third end portion fixedly attached to the second side portion of the body and a fourth end portion spaced apart laterally from the body a first sleeve slidably coupled to the first track;

a second sleeve slidably coupled to the second track;

a first shield carried by the first sleeve and attached to the second end portion of the first sleeve; and a second shield carried by the second sleeve and attached to the fourth end portion of the second sleeve, wherein the first and second tracks remain stationary with respect to the body, and wherein the first and second sleeves slide over at least a portion of the corresponding first and second tracks and move the corresponding first and second shields between a closed position proximate to the body and an open position spaced apart laterally from the body.

2. The opening structure of claim 1 wherein the first track includes a limit and the first sleeve includes a fillister, and wherein the limit engages the fillister and limits the movement of the first sleeve when the first shield is at the open position.

3. The opening structure of claim 1 wherein the first shield at least partially encloses the body and the imaging device in the closed position.

4. The opening structure of claim 1 wherein the first track includes a first lock that releasably retains the first sleeve when the first shield is in the closed position.

5. The opening structure of claim 4 wherein the first lock includes a first resilient protrusion.

6. The opening structure of claim 1 wherein the first track includes a second lock that releasably retains the first sleeve when the first shield is in the open position.

7. The opening structure of claim 6 wherein the second lock includes a second resilient protrusion.

8. The opening structure of claim 1 wherein the imaging device is at least one of a digital still camera, a digital camcorder and a digital media player.

9. An opening structure of an imaging device, the opening structure comprising:
   a body having a first side portion spaced apart from a second side portion, wherein the body is configured to hold the imaging device;
   a first track attached to and extending from the first side portion;
   a second track attached to and extending from the second side portion;
   a first sleeve slidably coupled to the first track and movable between a first closed position and a first open position;
   a second sleeve slidably coupled to the second track and movable between a second closed position and a second open position;
   a first shield carried by the first sleeve; and
   a second shield carried by the second sleeve, wherein the first and second shields enclose the body when the first sleeve is in the first closed position and the second sleeve is in the second closed position, and wherein the first and second tracks are fixedly attached to the body and remain stationary with respect to the body, and wherein the first and second sleeves slide over at least a portion of the corresponding first and second tracks and move the corresponding first and second shields with respect to the body.

10. The opening structure of claim 9 wherein the first track includes a first limit and the first sleeve includes a first fillister, and wherein the first limit engages the first fillister and limits the movement of the first sleeve when the first shield is at the first open position.

11. The opening structure of claim 9 wherein the second track includes a second limit and the second sleeve includes a second fillister, and wherein the second limit engages the second fillister and limits the movement of the second sleeve when the second shield is at the second open position.

12. The opening structure of claim 9 wherein the first track includes a first lock and a second lock, and wherein the first lock releasably retains the first sleeve at the first closed position and the second lock releasably retains the first sleeve at the first open position.

13. The opening structure of claim 12 wherein the first lock includes a first resilient protrusion, and the second lock includes a second resilient protrusion.

14. The opening structure of claim 12 wherein the second track includes a third lock and a fourth lock, and wherein the third lock releasably retains the second sleeve at the second closed position and the fourth lock releasably retains the second sleeve at the second open position.

15. The opening structure of claim 14 wherein the third lock includes a third resilient protrusion, and the fourth lock includes a fourth resilient protrusion.

16. The opening structure of claim 9 wherein the first shield includes a first magnetic member and the second shield member includes a second magnetic generally aligned with the first magnetic member when the first shield is in the first closed position and the second shield is in the second closed position.

17. The opening structure of claim 9 wherein the imaging device is at least one of a digital still camera, a digital camcorder and a digital media player.

18. The opening structure of claim 9 wherein the sleeve slides in a direction generally parallel to a longitudinal axis of the track.

19. An opening structure of an imaging device, the opening structure comprising:
   a body having a first side portion spaced apart from a second side portion, wherein the body is configured to hold the imaging device;
   a first track attached to and extending from the first side portion;
   a second track attached to and extending from the second side portion;
   a first sleeve slidably coupled to the first track and movable between a first closed position and a first open position;
   a second sleeve slidably coupled to the second track and movable between a second closed position and a second open position;
   a first shield carried by the first sleeve; and
   a second shield carried by the second sleeve, wherein the first and second shields enclose the body when the first sleeve is in the first closed position and the second sleeve is in the second closed position, wherein the first track includes a first lock and a second lock, and wherein the first lock releasably retains the first sleeve at the first closed position and the second lock releasably retains the first sleeve at the first open position, and wherein the second track includes a third lock and a fourth lock, and wherein the third lock releasably retains the second sleeve at the second closed position and the fourth lock releasably retains the second sleeve at the second open position.

20. The cover assembly of claim 19 wherein the first and second sleeves slide in a direction generally parallel to a longitudinal axis of the corresponding first and second tracks.

21. The cover assembly of claim 19 wherein the first and second covers generally enclose the body in the first positions, and wherein the first and second covers at least partially expose the imaging device in the open positions.

* * * * *